(12) United States Patent
Giovanelli

(10) Patent No.: US 7,431,144 B2
(45) Date of Patent: Oct. 7, 2008

(54) TEMPORARY STORAGE SYSTEM OF BELT TYPE

(75) Inventor: Mauro Giovanelli, Basilicagoiano (IT)

(73) Assignee: Zeccheiti S.R.L., Montecchio Emilia (IT)

( * ) Notice: Subject to any disclaimer, the term of this patent is extended or adjusted under 35 U.S.C. 154(b) by 243 days.

(21) Appl. No.: 10/983,592

(22) Filed: Nov. 9, 2004

(65) Prior Publication Data

US 2005/0098409 A1 May 12, 2005

(30) Foreign Application Priority Data

Nov. 12, 2003 (IT) .......................... RE2003A0107

(51) Int. Cl.
*B65G 1/00* (2006.01)
*B65G 47/51* (2006.01)

(52) U.S. Cl. .................. 198/603; 198/497; 198/570; 198/602; 198/603; 198/793; 198/817; 198/699.1; 198/347.1; 198/462.2

(58) Field of Classification Search ............... 198/474, 198/501, 824, 842, 492, 861.1, 347.1, 497, 198/570, 603, 620, 793, 817, 462.2, 699.1, 198/602

See application file for complete search history.

(56) References Cited

U.S. PATENT DOCUMENTS 4,078,648 A * 3/1978 Hinchcliffe et al. ...... 198/347.3
4,201,507 A * 5/1980 Hinchcliffe et al. .... 414/331.09
4,751,996 A * 6/1988 Knecht ..................... 198/347.1
4,751,998 A * 6/1988 Yano ........................ 198/465.1
4,899,869 A * 2/1990 Johnson ...................... 198/603
5,398,485 A * 3/1995 Osifchin ...................... 53/490
5,975,262 A * 11/1999 Saito et al. ................. 192/3.31
5,975,282 A * 11/1999 Shaver et al. ............... 198/603
6,039,169 A * 3/2000 Zaniboni ................. 198/347.1
6,295,860 B1 * 10/2001 Sakairi et al. .............. 73/23.41

* cited by examiner

*Primary Examiner*—Gene O. Crawford
*Assistant Examiner*—Kavel P Singh
(74) *Attorney, Agent, or Firm*—Browdy and Neimark, P.L.L.C.

(57) ABSTRACT

A temporary storage system (1) of belt type for lightweight hollow bodies (C), said system being particularly suitable for use with empty plastic containers (C) and of the type comprising a storage buffer vessel (2) provided with a feed entry opening (3) in its upper part and a discharge exit (4) in its lower part, said exit (4) being situated above conveyor means (5) for removal from the buffer vessel (2), said system comprising at least one movable storage belt (6a, 6b, 6c) positioned substantially horizontally in the interior of said buffer vessel (2), said storage belt (6a, 6b, 6c) being arranged to receive a falling plurality of desired volumes (D) of said hollow bodies (C), while advancing during the fall of said hollow bodies (C) by a distance sufficient to maintain said volumes (D) separate, said volumes (D) being made to advance towards the discharge exit (4) and allowed to fall onto the removal conveyor means (5) when said stored hollow bodies (C) are required to be withdrawn.

14 Claims, 3 Drawing Sheets

TEMPORARY STORAGE SYSTEM OF BELT TYPE

FIELD OF THE INVENTION

The present invention relates to a temporary storage system of belt type for lightweight hollow bodies (C), the system being particularly suitable for use with empty plastic containers (C).

More particularly, the present invention relates to a temporary storage system of belt type for storing lightweight hollow bodies, said system being especially designed for the temporary storage of empty plastic containers, although it can also regard other articles.

The present invention also relates to a method for storing and distributing empty lightweight containers.

The invention finds its main but not exclusive application to that industry producing plastic bottles by, for example, blow molding, to feed them to immediate palletizing.

Empty plastic bottles are currently palletized immediately after their production, effected generally by blow molding.

The bottles just produced by blow molding are directly fed to the palletizing system by a conveyor system which forms columns of these bottles on conveying guides.

The bottles are generally conveyed along an air conveyor line, the thrust required to advance them onto the guide (or guides) being provided by air jets introduced along the conveyor line.

The blow molding system produces the bottles at a virtually constant rate, hence if the palletizing system slows down or momentarily halts downstream of the bottle conveyor line, the bottle conveyor line risks becoming clogged, necessitating stoppage of the blow molding system.

To prevent stoppage of the blow molding system, which would then have to be re-started with consequent time loss, it is known to use systems for temporarily storing those bottles intended for palletizing which would otherwise clog the conveyor line for the aforesaid reasons, until normal palletizing is restored.

It is also known to effect temporary storage within suitably sized storage buffer vessels.

The bottles fall into the buffer vessels by gravity from the conveyor line, to be stored therein either directly, or by means of conveyor belts which convey the bottles which have fallen into the buffer vessels.

Their fall is triggered by suitable sensors which, having sensed clogging of the conveyor line, also open an overflow exit positioned below the bottles. When inside a large-capacity buffer vessel provided in its base with a discharge exit, lightweight hollow bodies such as thin plastic containers are inclined to form bridges which prevent their continuous regular flow through the discharge exit. This is due to the fact that these bodies, for example containers, are frequently of irregular shape with handles, necks, etc. resulting in their mutual fitting-together to form so-called bridge structures; these structures rest against the walls and hence clog the buffer vessel, consequently preventing those containers lying above them from descending by gravity to reach the lower region of the buffer vessel where the discharge exit is situated.

Another limit relating to the storage of lightweight empty containers in large-dimension buffer vessels is their relatively low resistance to compression.

Consequently, said containers are affected by the collisions which occur during their fall and the pressure exerted by the weight of a large quantity of containers heaped above a given container, which hence deforms.

This limits the maximum free fall height from the upper feed entry, meaning that very extended storage systems have to be provided to ensure an appreciable volume.

Another drawback is the difficulty of access to the buffer vessel often encountered in traditional systems, which are accessible only through their upper opening.

There is therefore a strongly felt need for a temporary storage system for lightweight hollow bodies which prevents their deformation when stored within a temporary storage buffer vessel.

SUMMARY OF THE INVENTION

The object of the present invention is to provide a temporary storage system of belt type having functional and structural characteristics such as to satisfy said requirements while at the same time obviating the aforesaid drawbacks with regard to the known art.

This object is attained by a temporary storage system of belt type for lightweight hollow bodies (C), the system being particularly suitable for use with empty plastic containers (C). The system comprises a storage buffer vessel (2) provided with a feed entry opening (3) in its upper part and a discharge exit (4) in its lower part. The exit (4) is situated above conveyor means (5) for removal from the buffer vessel (2). The system further comprises at least one movable storage belt (6a, 6b, 6c) positioned substantially horizontally in the interior of said buffer vessel (2). The storage belt (6a, 6b, 6c) is arranged to receive a falling plurality of desired volumes (D) of the hollow bodies (C), while advancing during the fall of the hollow bodies (C) by a distance sufficient to maintain the volume (D) separate. The volumes (D) are made to advance towards the discharge exit (4) and allowed to fall onto the removal conveyor means (5) when the stored hollow bodies (C) are required to be withdrawn. The system further comprises sensor means (8) for sensing that the desired volume (D) of containers (C) has been attained. The object is further obtained in accordance with a method for storing and distributing lightweight empty containers.

The dependent claims define particularly advantageous preferred embodiments of the storage system of belt type according to the invention.

BRIEF DESCRIPTION OF THE DRAWINGS

Further characteristics and advantages of the invention will be apparent on reading the ensuing description provided by way of non-limiting example, with the aid of the figures of the accompanying drawings, in which.

DESCRIPTION OF THE PREFERRED EMBODIMENT

Figure 1:
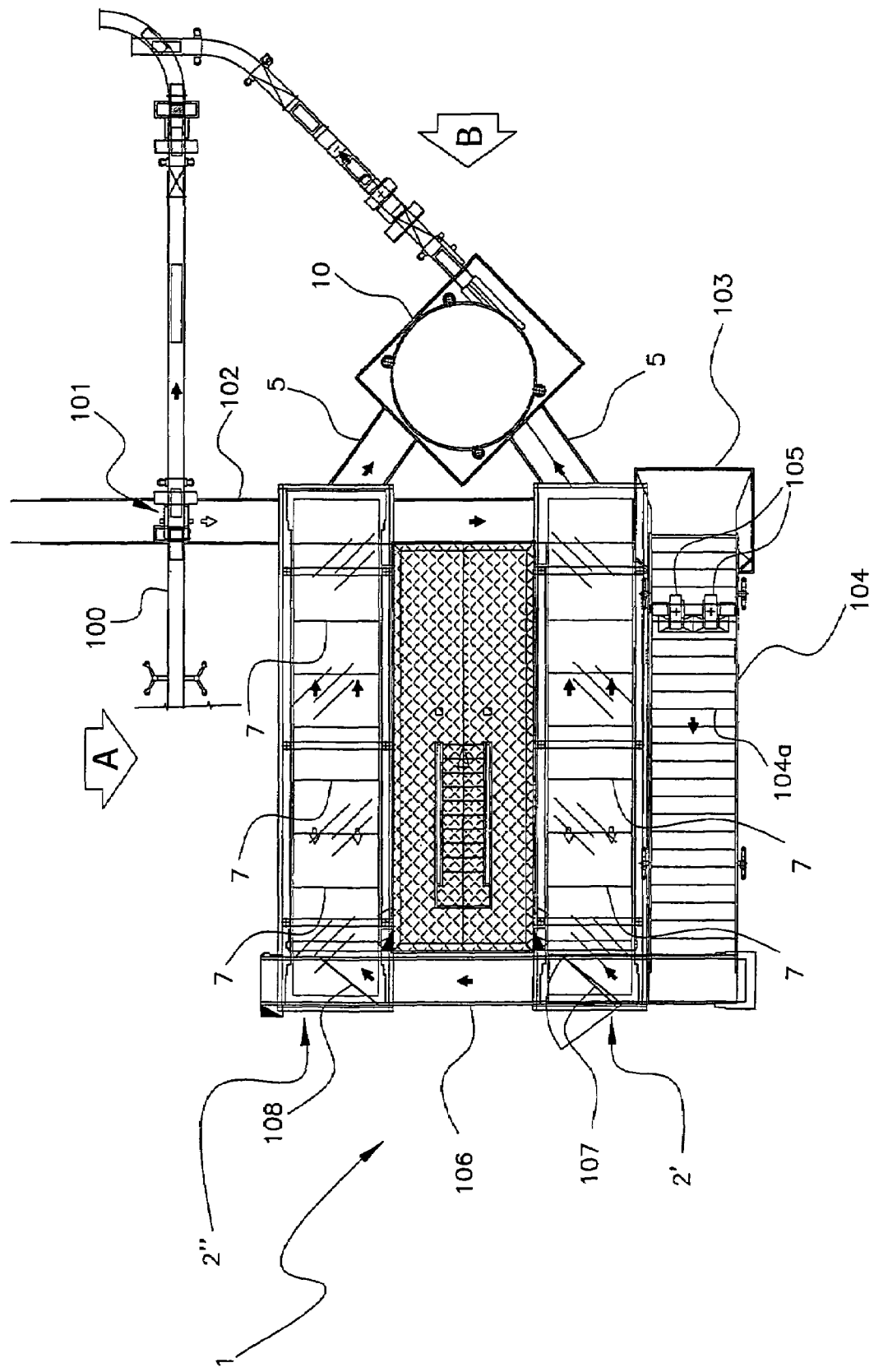
FIG. 1 is a view from above showing a temporary storage system of belt type according to the present invention.

With reference to said figures, the reference numeral 1 indicates overall a temporary storage system of belt type in accordance with the present invention.

Figure 2:
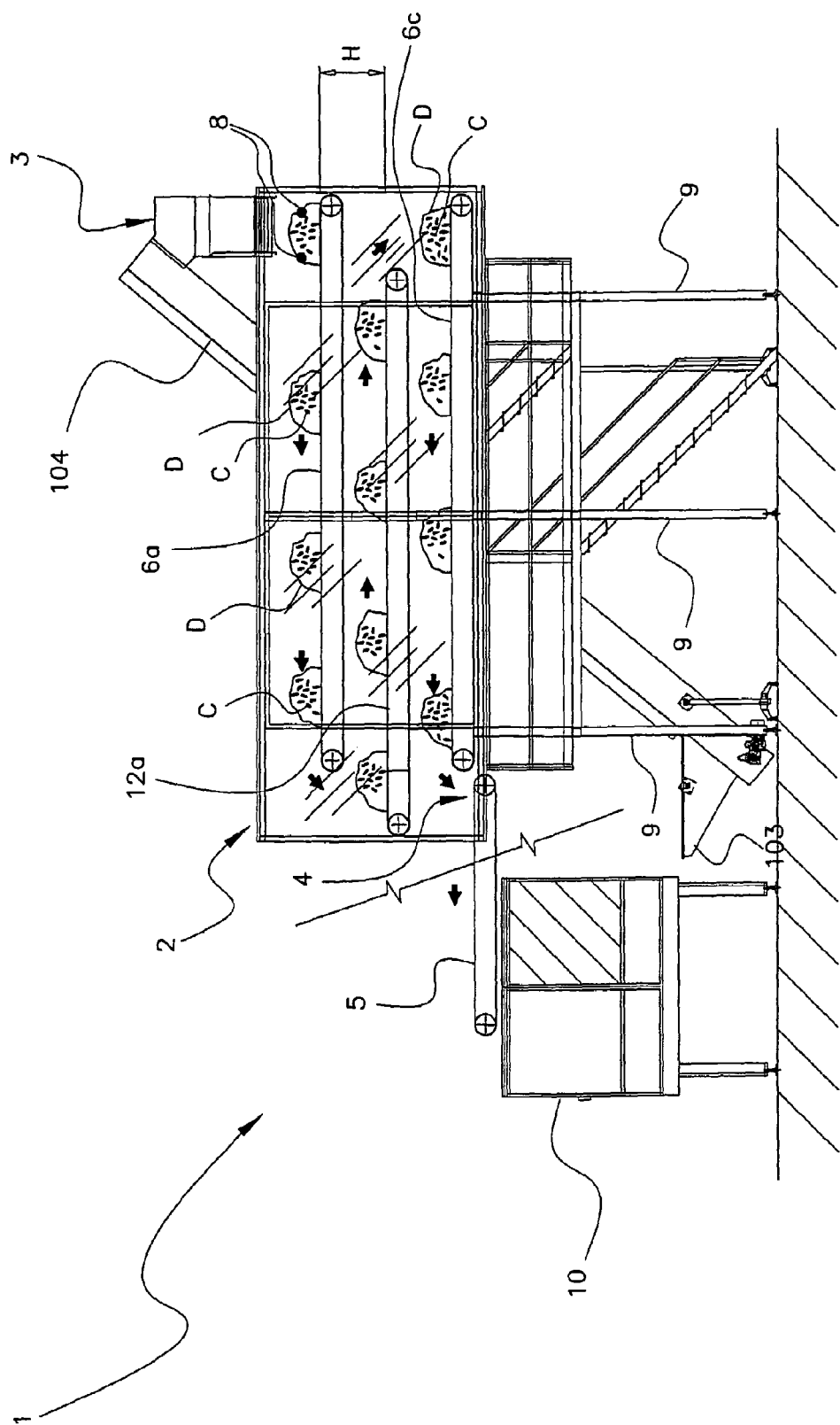
FIG. 2 is a front view of the storage system of FIG. 1 seen from A.
Figure 3:
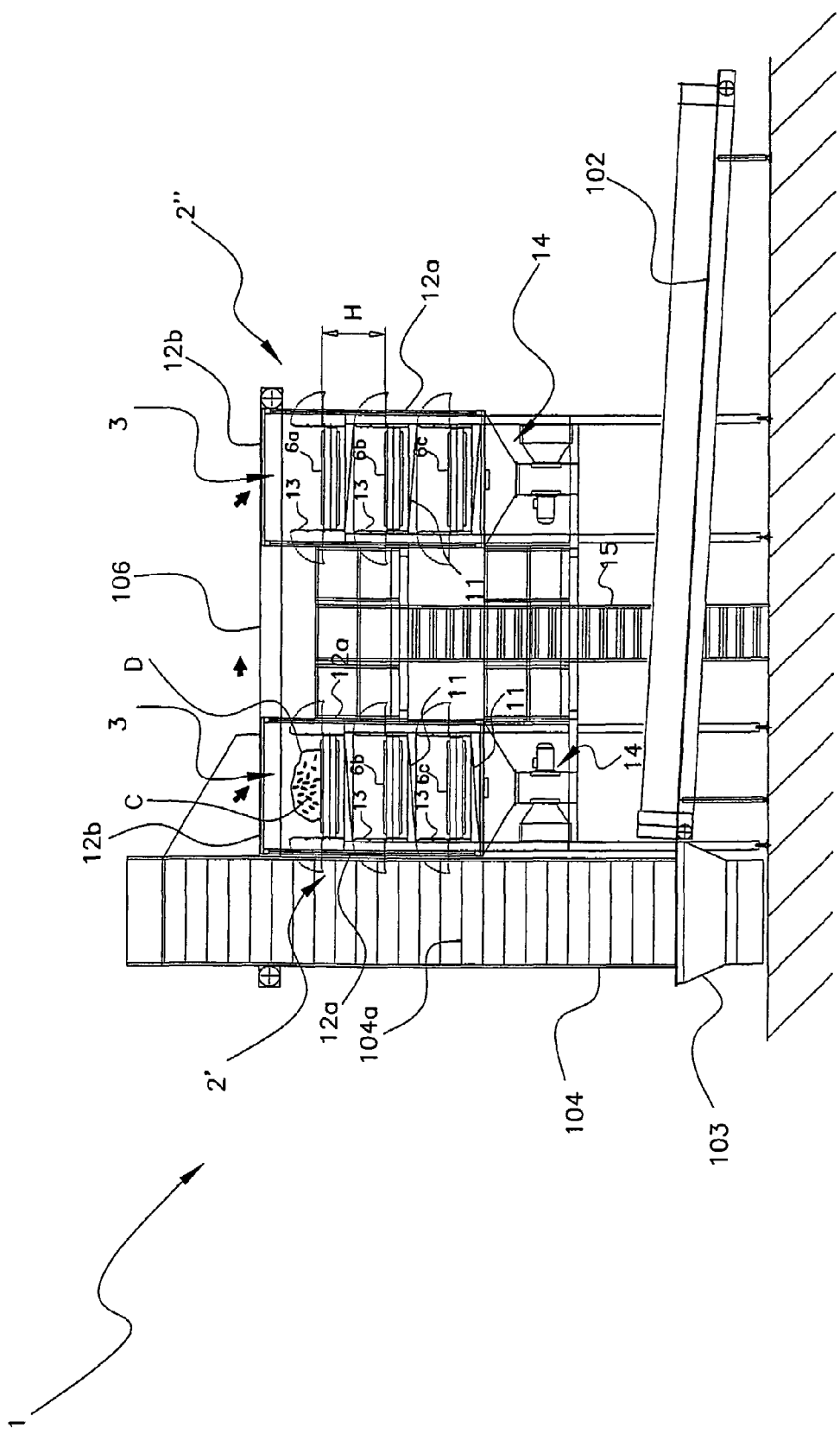
FIG. 3 is a side view of the storage system of FIG. 1 seen from B, with some details omitted.

Said temporary storage system comprises a storage buffer vessel 2 provided with a feed entry 3, located on its upper part, for lightweight hollow bodies such as empty plastic containers C, and a discharge exit 4 in its lower part (FIG. 2).

The discharge exit 4 is situated above a conveyor belt 5 for removal from the buffer vessel 2.

In the present invention, a lightweight hollow body means any hollow body which can easily deform but which presents a weight such that a predetermined quantity of hollow bodies forming a heap does not deform such a body lying beneath them.

Essentially, that lightweight empty container lying below a predetermined heap of such empty containers does not undergo any deformation, if the heap does not exceed a certain volume, while it is highly probable that it will undergo deformation if the heap exceeds said certain volume.

Moreover, the lightweight empty container can easily undergo surface deformation caused by a similar container falling from above, if this falls from a certain height.

According to a preferred embodiment of the present invention, the storage system 1 comprises three movable temporary storage belts, namely an upper storage belt 6a, a central storage belt 6b and a lower storage belt 6c (FIG. 2).

The three belts 6a, 6b, 6c are arranged horizontally, parallel and superposed in the interior of the buffer vessel 2 at a predetermined height H apart, the choice of which will be described hereinafter.

The storage system of belt type 1 will now be described in greater detail by following an operating cycle.

A blow molding system, not shown, produces the empty containers C and feeds them to a conveyor line, for example an air conveyor line 100 (FIG. 1).

Any stoppage of the flow of empty containers C along the air conveyor line 100, caused by total filling of the line 100 or by a problem downstream, causes an overflow exit 101 to open and enable the containers C to be extracted from the conveyor line 100, without interrupting operation of the blow molding system.

The extracted containers C fall onto a first conveyor belt 102 positioned slightly inclined to convey the containers C into a collection hopper 103 (FIG. 1 and FIG. 2).

Preferably, the first conveyor belt 102 is provided with small ribs (of height equal for example to 20 mm) positioned transversely to its advancement direction to prevent rolling of the containers C.

A belt elevator 104 extends from the hopper 103 at an inclination greater than that of the first conveyor belt.

The elevator 104 is also provided with ribs 104a (of height equal for example to 80 mm) placed transversely to its advancement direction to prevent the conveyed containers C from rolling and falling rearwards towards the hopper 103.

Preferably, a pair of ionizing units 105 are suitably disposed on the elevator 104 to discharge any electrostatic charges present on the conveyed containers C.

To prevent the containers C suffering denting or scratching during this initial reception of the containers C from the conveyor line 100, the first conveyor belt 102, the collection hopper 103 and the elevator 104 are lined with a suitable fabric.

The operation and stoppage of the first conveyor belt 102 and of the elevator 104 can be controlled by photoelectric cells located in the region below the fall of the containers C onto the first conveyor belt 102 and into the hopper 103.

According to the preferred embodiment of the present invention, on reaching the top of the belt elevator 104, the containers C fall onto a distribution belt 106.

A movable side wall 107 and an inclined fixed side wall 108 are located on this distribution belt 106.

When arranged inclined to the advancement direction of the containers C, the movable side wall 107 enables the containers C to be fed to a first unit 2' of the collection buffer vessel 2, whereas when arranged parallel to the advancement direction of the containers C, the containers C arrive at the inclined fixed side wall 108, which then feeds the containers C to a second unit 2" of the buffer vessel 2.

The choice of whether to feed the containers C into the first unit 2' rather than into the second unit 2" is made on the basis of the quantity of containers C to be stored in the buffer vessel 2.

If the second unit 2" is absent, the side wall 107 of the distribution belt 106 is fixed.

In the continuation of the present description, explicit reference will be made to only one of the two units 2', 2" of the buffer vessel 2, however in so doing, reference will also be implicitly made to the other unit.

Consequently, the reference numerals are identical for the same elements of the two units 2' and 2".

The upper storage belt 6a receives a first desired volume D of said containers C falling from the feed entry opening 3.

Said desired volume D is of such dimensions as to enable the underlying container C to withstand the weight of the overlying containers C without deformation, and to enable the upper belt 6a to receive further predetermined volumes D of containers C falling from the feed entry opening 3.

Each of said predetermined volumes D is received in succession by the upper belt 6a.

In practice, after the fall of the first desired volume D of containers C, the upper belt 6a advances through a predetermined distance sufficient to position a free portion of the belt below the feed entry opening to receive a second desired volume D of containers C, and so on.

When the entire upper belt 6a has been filled with a plurality of predetermined volumes D of containers C, a further advancement of the upper belt 6a causes volumes D to fall in succession on the underlying intermediate belt 6b.

When the entire intermediate belt 6b has been filled with a plurality of predetermined volumes D of containers C, a further advancement of the intermediate belt 6b causes volumes D to fall in succession onto the underlying lower belt 6c.

The three belts 6a, 6b and 6c are positioned offset and cause said volumes D of containers C to advance in opposite directions, causing said volumes D to undergo a zigzag path.

During their transfer from one to the underlying storage belt the containers C must not suffer any denting or scratching.

The height H must therefore be suitably chosen for this purpose.

In this respect said height H is chosen on the basis of the type of containers C to be stored and, in the example, is 750 mm for the 2 liter PET containers concerned. Such containers C falling from this height neither suffer denting themselves nor cause denting to the underlying container or containers.

Each storage belt 6a, 6b, 6c is provided with a plurality of ribs 7 (for example of height 20 mm) which provide the friction required to move the volumes D without damaging the containers C, and define the base of the volume D of containers C.

The upper belt 6a is caused to advance through the predetermined distance by sensor means, which in the example are two photoelectric cells 8 located in the falling region below the feed entry opening 3.

Said photoelectric cells 8 are positioned at a height of about 250 mm from the surface of the upper belt 6a and spaced apart by about 400 mm.

When the containers C falling onto the upper belt 6a reach the two photoelectric cells 8, the desired volume D has been formed, the upper belt 6a then undergoing movement until the two photoelectric cells 8 are free to receive the next volume D.

In this manner the storage belt 6a undergoes a gradual stepping movement.

The height at which the photoelectric cells 8 are positioned can be adjusted to enable the size of the desired volume of stored containers C to be varied.

Preferably, the movement of the intermediate belt 6b and of the lower belt 6c is also controlled by photoelectric cells positioned above each storage belt 6b, 6c, however this movement could also be controlled by the photoelectric cells 8 of the upper belt 6a alone.

The lower storage belt 6c moves the volumes D present on it towards the discharge exit 4.

The time required to fill one unit of the buffer vessel 2 is about 10 minutes, however this time, known as the storage time, can be increased (or decreased) at will on the basis of the dimensions of the buffer vessel 2.

When stored containers C are to be withdrawn, the lower belt 6c allows the containers C to fall onto the removal conveyor belt 5 and is thus available to simultaneously receive the volumes D of containers C from the overlying belt.

Preferably, during the emptying of the buffer vessel 2, the storage belts 6a, 6b, 6c move continuously, not stepwise as in the case of filling, in order to accelerate emptying of the buffer vessel 2.

The removal belt 5 conveys the containers C to a known reorganizer 10 which feeds them into the conveyor line to the palletizing system.

The filling of each unit 2', 2" of the buffer vessel 2 is controlled by a control system which properly controls the filing and emptying of the two units 2', 2" in synergy.

The distribution belt 106, the storage belts 6a, 6b, 6c, and the removal belt 5 are also lined with a fabric or equivalent means to protect the containers C against denting and/or scratching.

The belts are driven by known means, which are therefore not illustrated in detail.

Certain expedients are present to safeguard the hygiene of the containers C.

For example, plates 11 can be inserted slightly inclined outwardly into the lower part of the storage belts 6a, 6b, 6c to prevent any impurities, originating from the overlying storage belt, from falling onto the underlying containers C.

Such plates 11 are evidently absent in those regions in which the containers C fall.

The storage belts 6a, 6b, 6c can also be isolated from the surrounding environment by using paneling, for example of aluminum and polycarbonate, the paneling on the sides 12a being slidable and openable, whereas the upper paneling 12b can be easily removed.

In addition, doors 13 constructed partly of polycarbonate can be rotatably provided on the inner part of the paneling 12a in proximity to the lateral edges of the belts 6a, 6b, 6c to enable these to be inspected when lowered.

Said doors 13 essentially bound the volume D of containers C laterally. The air quality can be further preserved by using a unit 14 for feeding filtered air into the buffer vessel 2 by forced ventilation.

Access to the buffer vessel 2 is also possible from access stairs 15 located between the two units 2a, 2b of the buffer vessel 2.

The entire storage system is supported by support means such as a support frame 9 anchored to a floor surface.

Preferably the entire storage and make-up system is controlled by a PC, the interface of which can be a touch screen.

As an alternative to the use of two units within the buffer vessel 2, more than two units or a single unit can be used.

In its simplest version the buffer vessel consists of a single storage belt which receives the containers C directly from the belt elevator 104.

It should be noted that none of the falls undergone by the containers C exceeds the predetermined height H for maintaining shape integrity of the containers C.

As will be apparent from the aforegoing description, the storage system of belt type according to the present invention satisfies those requirements and overcomes those drawbacks stated in the introduction to the present description with regard to the known art.

In this respect, the storage system of belt type of the present invention prevents deformation of the temporarily stored hollow bodies.

Moreover, said storage system of belt type is easily accessible by an operator to carry out any checks, repairs or cleaning.

The storage system of the invention occupies a small surface even though providing a high filling volume, achieved without compelling the hollow bodies to fall from a height such as to cause denting.

Finally, said system prevents dust deposition in the interior of the storage buffer vessel, so ensuring that aseptic conditions are maintained in its interior.

To satisfy specific contingent requirements, an expert of the art could apply numerous modifications and variants to the aforedescribed storage system of belt type, all of which fall within the scope of protection of the invention, as defined by the following claims.

What is claimed is:

1. A temporary storage system (1) of belt type for lightweight hollow bodies (C), said system being particularly suitable for use with empty plastic containers (C) and comprising:
- a storage buffer vessel (2) provided with a feed entry opening (3) in an upper part of the vessel (2) and a discharge exit (4) in a lower part of the vessel (2), said exit (4) being situated above a conveyor means (5) for removal from the buffer vessel (2);
- at least one movable storage belt (6a, 6b, 6c) positioned substantially horizontally in an interior of said buffer vessel (2), said storage belt (6a, 6b, 6c) being arranged to receive a falling plurality of desired volumes (D) of said hollow bodies (C), while advancing during the fall of said hollow bodies (C) by a distance sufficient to maintain said volumes (D) separate, said volumes (D) being made to advance towards the discharge exit (4) and allowed to fall onto the conveyor means (5) when said stored hollow bodies (C) are required to be withdrawn; and
- sensor means (8), placed in a region in which the hollow bodies (C) fall on said movable storage belt (6a, 6b, 6c), for sensing that the desired volume (D) of hollow bodies (C) has been attained, said sensor means (8) then operating said movable storage belt (6a, 6b, 6c) for advancing it to free a receiving space for a next volume (D) of hollow bodies (C), wherein said sensor means comprises at least one sensor that determines when the desired volume (D) of hollow bodies (C) reaches a predetermined height.

2. A storage system (1) as claimed in claim 1, wherein said at least one movable storage belt comprises:
- a plurality of movable parallel storage belts (6a, 6b, 6c) disposed horizontally and superposed in the interior of the buffer vessel at a predetermined distance (H) apart, said distance (H) constituting a limitation on the maximum free fall and the maximum compressive action sustained by a hollow body (C) situated at a lower level, wherein said belts (6a, 6b, 6c) are positioned offset and advancing said volumes (D) of hollow bodies (C) in opposite directions to enable the highest belt (6a) to pour said volume (D) of hollow bodies (C) onto the next lower belt (6b) and to enable said next lower belt to pour said volume (D) of hollow bodies (C) onto the lowest belt (6c), so causing said volumes (D) to follow a zigzag path, the highest belt (6a) receiving the volumes (D) of hollow bodies (C) from the entry (3), the lowest belt (6c) conveying the volumes (D) of hollow bodies (C) towards the discharge exit (4).

3. A storage system (1) as claimed in claim 1, wherein said at least one movable belt (6a, 6b, 6c) comprises:

a plurality of ribs (7) projecting from the surface of said belt (6a, 6b, 6c), and disposed perpendicular to the advancement direction of the belt (6a, 6b, 6c) and bounding the base of said volume (D) of hollow bodies (C).

4. A storage system (1) as claimed in claim 1, wherein said buffer vessel (2) comprises:

slidable paneling (12a, 12b) positioned on an upper side and on perimetral sides to isolate the environment inside the buffer vessel (2) from the environment outside the buffer vessel (2).

5. A storage system (1) as claimed in claim 1, further comprising:

at least one ventilated ionizing unit (105) positioned upstream of the entry to the buffer vessel (2) to discharge the electrostatic charge on the hollow bodies (C) before the hollow bodies (C) enter the buffer vessel (2).

6. A storage system (1) as claimed in claim 1, further comprising:

a unit (14) for feeding filtered air into the buffer vessel (2) by forced ventilation.

7. A storage system (1) as claimed in claim 1, further comprising:

a belt conveyor system (102, 104, 106) that is configured to convey said hollow bodies (C) to the entry of the buffer vessel (2).

8. A storage system (1) as claimed in claim 2, wherein said at least one movable belt (6a, 6b, 6c) comprises a plurality of ribs (7) projecting from the surface of said belt (6a, 6b, 6c), and disposed perpendicular to the advancement direction of the belt (6a, 6b, 6c) and bounding the base of said volume (D) of hollow bodies (C).

9. A storage system (1) as claimed in claim 2, wherein said buffer vessel (2) comprises slidable paneling (12a, 12b) positioned on the upper side and on the perimetral sides to isolate the environment inside the buffer vessel (2) from the environment outside the buffer vessel (2).

10. A storage system (1) as claimed in claim 2, comprising at least one ventilated ionizing unit (105) positioned upstream of the entry to the buffer vessel (2) to discharge the electrostatic charge on the hollow bodies (C) before the hollow bodies (C) enter the buffer vessel (2).

11. A storage system (1) as claimed in claim 2, comprising a unit (14) for feeding filtered air into the buffer vessel (2) by forced ventilation.

12. A storage system (1) as claimed in claim 2, further comprising a belt conveyor system (102, 104, 106) configured to convey said hollow bodies (C) to the entry of the buffer vessel (2).

13. A method for storing and distributing lightweight empty containers (C) by means of a storage system (1), said system (1) comprising a storage buffer vessel (2) provided with a feed entry (3) in its upper part and a discharge exit (4) in its lower part, said exit (4) being situated above conveyor means (5) for removal from the buffer vessel (2), said method comprising:

advancing at least one movable storage belt (6a, 6b, 6c) positioned substantially horizontally in the interior of said buffer vessel (2), through a distance sufficient to receive a falling plurality of desired volumes (D) of said hollow bodies (C) in such a manner as to maintain said volumes (D) mutually separate;

advancing said volumes (D) towards the discharge exit (4) and allowing said volumes (D) to fall onto the removal conveyor means (5) when said stored hollow bodies (C) are required to be withdrawn;

sensing, via sensor means (8), placed in a region in which hollow bodies (C) fall on said movable storage belt (6a, 6b, 6c), that the desired volume (D) of hollow bodies (C) has been attained, and following a signal from said sensor means (8), advancing said movable storage belt (6a, 6b, 6c) to free a receiving space for a next volume (D) of hollow bodies (C), wherein said step of sensing comprises determining, via said sensor means, when the desired volume (D) of hollow bodies (C) reaches a predetermined height.

14. A method as claimed in claim 13, wherein said at least one movable storage belt consists of a plurality of movable parallel storage belts (6a, 6b, 6c) disposed horizontally and superposed in the interior of the buffer vessel (2) at a predetermined distance (H) apart, said distance (H) being such as to maintain the shape integrity of the hollow body (C), said belts (6a, 6b, 6c) being positioned offset from one another, said method comprising:

effecting an initial feed from the entry (3) located on the highest belt (6a), which receives said desired volume (D) of hollow bodies (C) and advances through a predetermined distance to receive a further desired volume (D) of hollow bodies (C);

advancing a desired volume (D) of empty hollow bodies (C) in opposite directions via said at least one movable storage belt to enable the highest belt (6a) to pour said volume (D) of hollow bodies (C) onto the next lower belt (6b) and to enable the next lower belt (6b) to pour said volume (D) onto the lowest belt (6c), so causing said volume (D) to follow a zigzag path; and effecting discharge from the discharge exit (4) located downstream of the lowest belt (6c) when said stored hollow bodies (C) are required to be withdrawn.

* * * * *